(No Model.)

J. NAGELDINGER.
PRESSURE REGULATING VALVE.

No. 520,268. Patented May 22, 1894.

WITNESSES:
Jacob Nussblatt
Kate R. Brennan

INVENTOR
John Nageldinger
BY
ATTORNEYS.

THE NATIONAL LITHOGRAPHING COMPANY,
WASHINGTON, D. C.

UNITED STATES PATENT OFFICE.

JOHN NAGELDINGER, OF NEW YORK, N. Y.

PRESSURE-REGULATING VALVE.

SPECIFICATION forming part of Letters Patent No. 520,268, dated May 22, 1894.

Application filed October 16, 1893. Serial No. 488,312. (No model.)

*To all whom it may concern:*

Be it known that I, JOHN NAGELDINGER, a citizen of the United States, residing in the city, county, and State of New York, have invented certain new and useful Improvements in Pressure-Regulating Valves, of which the following is a specification.

This invention relates to certain improvements in pressure-regulating valves for liquid carbonic acid and other fluids, whereby a more reliable action of the regulating valve is obtained and the overbending or permanent bulging out of shape of the diaphragm is effectively prevented.

In the pressure-regulating valves heretofore used for reducing the pressure of liquid carbonic acid or other fluids it occurs frequently that the diaphragm in the valve casing which is acted upon by the tension of a pressure-regulating spring, is permanently injured either by the too sudden opening of the supply-valve or by the accidental turning of the screw by which the pressure-regulating spring is adjusted when there is pressure in the valve-casing. By a sudden rise in the pressure or a greatly increased pressure, the diaphragm is bulged out of shape, as there is not sufficient counter-pressure on the same so that the proper working of the pressure-regulating-valve is impaired and that the diaphragm has to be replaced for restoring the proper working of the valve.

The object of this invention is to supply a pressure-regulating-valve for liquid carbonic acid and other fluids under pressure, by which the objections referred to are effectually overcome and by which a reliably-working valve is obtained that is very sensitive to the differences of pressure of the gas; and the invention consists of a pressure-regulating-valve in which the orifice of the supply-pipe is opened or closed by an independent, spring-actuated valve which is not connected with the spindle of the vibrating-diaphragm, the diaphragm being protected against injury by overbulging by means of the concaved inner surface of the adjacent wall of the valve-casing. The diaphragm is acted upon by a pressure-regulating spring and screw, while the spindle which is attached to the diaphragm is made of tubular shape, recessed at one side and guided in a stationary ring on the supply-pipe, as will be fully described hereinafter and finally pointed out in the claims.

Figure 1:
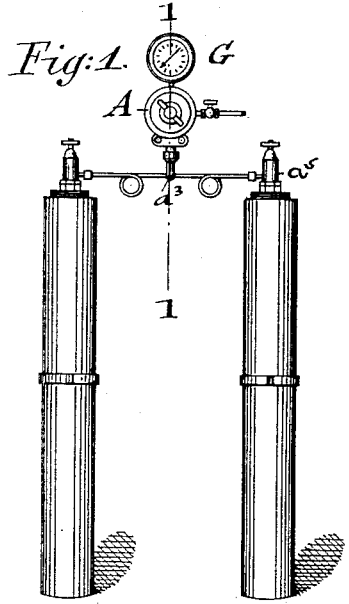
Figure 2:
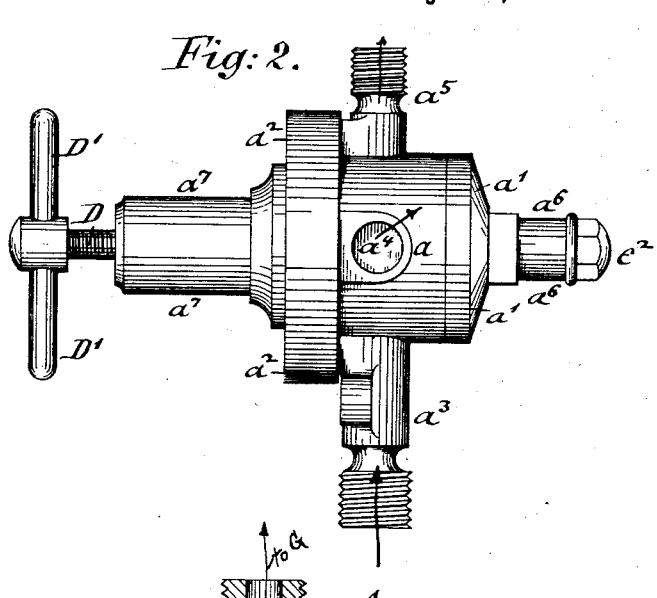
Figure 3:
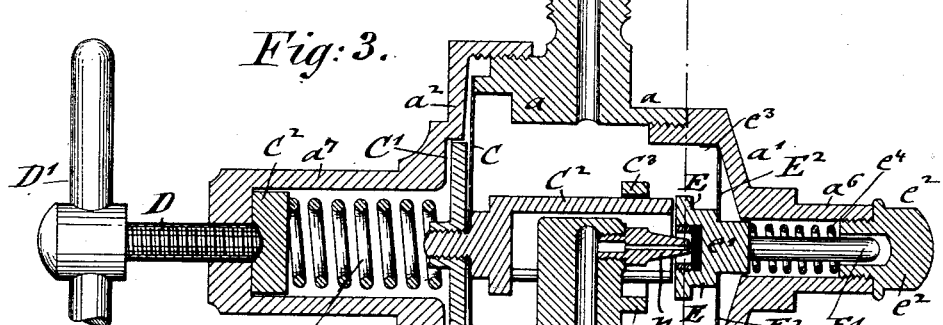
Figure 4:
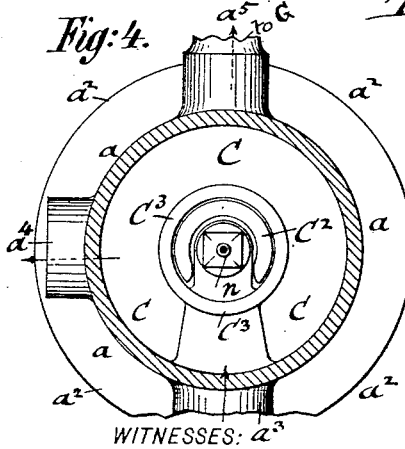
Figure 5:
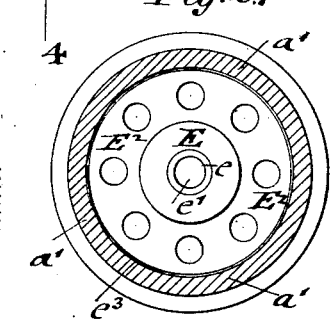

In the accompanying drawings, Figure 1 represents a front-elevation of my improved pressure-regulating valve, showing it in connection with two cylinders containing liquid carbonic acid. Fig. 2 is a side-elevation of the valve drawn on a larger scale. Fig. 3 is a vertical longitudinal section of the valve on line 1—1, Fig. 1, drawn on a still larger scale than Fig. 2. Fig. 4 is a vertical transverse section on line 4—4, Fig. 3, and Fig. 5 is an inside view of the tubular cover of the valve casing, showing the spring-actuated valve in the same.

Similar letters of reference indicate corresponding parts.

Referring to the drawings, A represents the casing of my improved pressure-regulating valve, which is preferably made of three sections, a cylindrical middle section $a$, a smaller end-section $a'$ and a larger end-section $a^2$. The cylindrical section $a$ is provided with a supply-pipe $a^3$, which communicates with the cylinder or other reservoir containing the gas under pressure, with an outlet-pipe $a^4$ through which the gas is conducted to the place of use, and a pipe $a^5$ that connects the valve casing with a suitable pressure-gage G, as shown in Fig. 3.

The cylindrical middle portion $a$ of the valve-casing is exteriorly threaded at one end for screwing on the same the interiorly-threaded section $a^2$, the opposite end being provided with an interior screw thread for the exteriorly-threaded section $a'$. Both sections $a'$ and $a^2$ are provided with central cylindrical housings $a^6$, $a^7$, the housing $a^7$ containing a strong helical spring B, which acts on a diaphragm C, that is soldered or otherwise attached to an interior rim or flange of the cylindrical section $a$. The spring B is adjusted to the degree of pressure to which the gaseous fluid is to be reduced by the valve. The diaphragm C is reinforced by a center-disk C', that forms a washer for the pressure-regulating spring B, said spring abutting at its opposite end against an interior washer $C^2$ for the adjusting screw D, which passes through the end of the cylindrical housing $a^7$ and is provided with a suitable handle $D'$ at its outer end.

The inner surface of the section $a^2$ of the valve-casing is provided with a central recess for the center disk or washer $C'$ and with a concaved portion concentric to the center recess and adjacent to the diaphragm C, said concaved surface serving to support the diaphragm when the same is expanded to its maximum extent, so as to prevent the overstraining or bulging of the diaphragm, when subjected to too great degree of pressure. To the center disk $C'$ of the diaphragm C is attached a hollow spindle $C^2$, which is recessed at one side, so as to permit the supply-pipe $a^3$ to enter into the tubular spindle $C^2$. The supply-pipe $a^3$ is provided at its inner end with a nozzle $n$ which is arranged at right angles to the supply-pipe and which has a small discharge orifice for the escape of the gas. The tubular spindle $C^2$ is guided in line with its axis by a stationary ring $C^3$, on the inner end of the supply-pipe $a^3$, as shown in Figs. 3 and 4. The orifice of the nozzle $n$ is closed by a spring-actuated valve E, which is provided with a central recess $e$ having a contact block $e'$ of hard rubber or other suitable material inserted into the same. The spindle $E'$ of the valve E is guided in the screw-cap $e^2$ of the cylindrical housing $a^6$, while the shouldered body of the valve is guided in a perforated diaphragm $E^2$ which is seated by its turned up circumferential flange $e^3$ at the interior of the section $a'$ of the valve-casing, as shown clearly in Figs. 3 and 5. The diaphragm $E^2$ assists by its spring-action in the quick return of the valve on the seat. Between the inner end of the screw-cap $e^2$ and the valve E, is inserted a helical spring $e^4$ which tends to press the valve E toward the orifice of the nozzle $n$ so as to close the same, the body of the valve being steadied in its motion by the perforated diaphragm $E^2$.

When the spring B of the diaphragm C is adjusted to the required degree of pressure to which the gas is to be reduced and the discharge cock of the receiver containing the gas under pressure is opened, the gas passes through the supply-pipe and the nozzle $n$ and expands into the valve-casing and acts on the diaphragm C. The counter-pressure of the spring B on the diaphragm C is thereby overcome and the spindle $C^2$ compelled to recede under the pressure of the gas, so as to move away from the valve E. As the valve E is under the pressure of its spring, it follows the motion of its spindle until it closes again the orifice of the nozzle $n$ and interrupts thereby the supply of gas to the valve-casing. As soon as the pressure of the spring B overcomes the pressure of the gas in the valve-casing the spindle $C^2$ is moved in the opposite direction, so that it moves the valve E away from the orifice of the nozzle $n$ and permits thereby another quantity of gas to pass into the casing. As soon as the gas pressure in the valve-casing rises beyond the tension to which the spring B is set, the discharge of gas is interrupted by the receding of the diaphragm C and spindle $C^2$, so that the independently movable valve E closes the orifice of the nozzle $n$. The vibrations imparted to the tubular spindle by the action of the gas pressure and the tension of the spring acting on the diaphragm C, and the independent play of the spring-actuated valve E produces a very effective action of the valve, so that the gas is supported at a lower pressure than in the receiver to the place of use.

The diaphragm, which is ordinarily the most sensitive part of the pressure regulating-valves, is protected against overbulging or permanent injury by the concaved inner surface of the larger section $a^2$ of the valve-casing, against which the diaphragm is pressed whenever a too great pressure is suddenly exerted on the same, so that it hugs the concaved surface closely until the pressure in the casing is sufficiently reduced to permit the free play of the diaphragm. In this manner, a pressure regulating-valve for carbonic acid gas or other fluids is obtained, which by the play of the spindle attached to the diaphragm and the independent play of the spring-actuated valve by which the nozzle is opened or closed, is adapted in a high degree to regulating and reducing of the pressure of the gaseous fluids.

Having thus described my invention, I claim as new and desire to secure by Letters Patent—

1. The combination of a valve-casing, provided with a supply-pipe having a discharge nozzle, a spring-actuated diaphragm in said casing, a spindle attached to said diaphragm and an independently operating spring-actuated valve adapted to open and close the nozzle said valve being detached from the spindle, and the spring thereof being mounted in the casing substantially as set forth.

2. The combination, of a valve-casing, provided with a supply-pipe having a discharge-nozzle, a spring-actuated diaphragm in said valve-casing, a tubular and side-recessed spindle, attached to said diaphragm, an independently operating spring-actuated valve located in line with the spindle and nozzle and adapted to open or close the nozzle in connection with the vibrations of the spindle, substantially as set forth.

3. The combination, of a valve-casing, provided with a supply-pipe and a discharge-pipe, a discharge-nozzle arranged at right angles to the supply-pipe, a spring-actuated diaphragm in said casing, a tubular spindle attached to said diaphragm in line with said nozzle so as to inclose it and having a side-recess for the supply-pipe, and an independently operating spring-actuated valve located in line with the spindle and nozzle, substantially as set forth.

4. The combination of a valve-casing, provided with a supply-pipe, having a discharge-nozzle, a guide-ring on said supply-pipe, a spring-actuated diaphragm in said valve-casing, a tubular spindle attached to said diaphragm, and guided within said ring said spindle inclosing said nozzle and having a side-recess for the supply-pipe, and an independently operated spring-actuated valve and means for guiding said valve in the valve-casing, substantially as set forth.

5. The combination of a valve-casing provided with a supply-pipe having a discharge-nozzle, a spring-actuated diaphragm on said casing, a spindle attached to said diaphragm, a spring-actuated valve adapted to open or close the nozzle and a perforated diaphragm applied to the shouldered body of the valve, substantially as set forth.

In testimony that I claim the foregoing as my invention I have signed my name in presence of two subscribing witnesses.

JOHN NAGELDINGER.

Witnesses:
PAUL GOEPEL,
CHARLES SCHROEDER.